US008131542B2

(12) United States Patent
Nakajima et al.

(10) Patent No.: US 8,131,542 B2
(45) Date of Patent: Mar. 6, 2012

(54) SOUND SOURCE SEPARATION SYSTEM WHICH CONVERGES A SEPARATION MATRIX USING A DYNAMIC UPDATE AMOUNT BASED ON A COST FUNCTION

(75) Inventors: Hirofumi Nakajima, Wako (JP); Kazuhiro Nakadai, Wako (JP); Yuji Hasegawa, Wako (JP); Hiroshi Tsujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 944 days.

(21) Appl. No.: 12/133,691

(22) Filed: Jun. 5, 2008

(65) Prior Publication Data

US 2008/0306739 A1 Dec. 11, 2008

Related U.S. Application Data

(60) Provisional application No. 60/942,799, filed on Jun. 8, 2007.

(30) Foreign Application Priority Data

May 21, 2008 (JP) ................................ 2008-133175

(51) Int. Cl.
*G10L 19/00* (2006.01)
*H03F 1/26* (2006.01)
(52) U.S. Cl. ......... 704/218; 704/216; 704/201; 702/196
(58) Field of Classification Search .................. None
See application file for complete search history.

(56) References Cited

U.S. PATENT DOCUMENTS

| 6,845,164 | B2 * | 1/2005 | Gustafsson | ................. | 381/94.1 |
| 6,898,612 | B1 | 5/2005 | Parra et al. | | |
| 6,944,579 | B2 * | 9/2005 | Shimizu | ....................... | 702/196 |
| 7,076,433 | B2 * | 7/2006 | Ito et al. | ....................... | 704/500 |

(Continued)

FOREIGN PATENT DOCUMENTS

WO 2005/055201 6/2005

OTHER PUBLICATIONS

Yuan et al. "Variable Step-Size Sign Natural Gradient Algorithm for Sequential Blind Source Separation". IEEE Signal Processing Letters, vol. 12 No. 8, Aug. 2005.*

(Continued)

*Primary Examiner* — Talivaldis Ivars Smits
*Assistant Examiner* — Jesse Pullias
(74) *Attorney, Agent, or Firm* — Rankin, Hill & Clark LLP

(57) ABSTRACT

A system capable of separating sound source signals with high precision while improving a convergence rate and convergence precision. A process of updating a current separation matrix $W_k$ to a next separation matrix $W_{k+1}$ such that a next value $J(W_{k+1})$ of a cost function is closer to a minimum value $J(W_0)$ than a current value $J(W_k)$ is iteratively performed. An update amount $\Delta W_k$ of the separation matrix is increased as the current value $J(W_k)$ of the cost function is increased and is decreased as a current gradient $\partial J(Wk)/\partial W$ of the cost function is rapid. On the basis of input signals x from a plurality of microphones $M_i$ and an optimal separation matrix $W_0$, it is possible to separate sound source signals $y(=W_0 \cdot x)$ with high precision while improving a convergence rate and convergence precision.

7 Claims, 10 Drawing Sheets

U.S. PATENT DOCUMENTS 7,315,816 B2 * 1/2008 Gotanda et al. .............. 704/226
7,496,482 B2 * 2/2009 Araki et al. .................. 702/190

OTHER PUBLICATIONS

Adaptive Step-Size Parameter Control for Real-World Blind Source Separation, Hirofumi Nakajima et al., ICASSP 2008, pp. 149-152.
XP-010712478, An On-Line Algorithm for Blind Source Extraction Based on Nonlinear Prediction Approach, Danilo P. Mandic et al., 2003 IEEE XIII Workshop on Neural Networks for Signal Processing, pp. 429-438.
Convolutive Blind Separation of Non-Stationary Sources, Lucas Parra and Clay Spence, IEEE Transactions on Speech and Audio Processing, vol. 8, No. 3, May 2000, pp. 320-327.
Combined Approach of Array Processing and Independent Component Analysis for Blaind Separation of Acoustic Signals, Futoshi Asano et al., IEEE Transactions on Speech and Audio Processing, vol. 11, No. 3, May 2003, pp. 204-215.
Inverse Filtering of Room Acoustics, Masato Miyoshi and Yutaka Kaneda, IEEE Transactions on Acoustics, Speech, and Signal Processing, vol. 36, No. 2, Feb. 1988, pp. 145-152.
Sound Field control by Indefinite MINT Filters, Hirofumi Nakajima et al., IEICE Trans. Fundamentals, vol. E80-A, No. 5, May 1997, pp. 821-824.
A Method of ICA in Time-Frequency Domain, Shiro Ikeda and Noboru Murata.
A complex gradient operator and its application in adaptive array theory, D.H. Brandwood, B.A., IEE Proc. vol. 130, Pts. F and H, No. 1, Feb. 1983 pp. 11-16.
Natural Gradient Works Efficiently in Learning, Shun-ichi Amari, Neutral Computation 10, (1998), pp. 251-276.
Geometric Source Separation: Merging Convolutive Source Separation With Geometric Beamforming, Lucas C. Parra and Christopher V. Alvino, IEEE Transactions on Speech and Audio Processing, vol. 10, No. 6, Sep. 2002, pp. 352-362.
Blind Source Separation of Many Signals in the Frequency Domain, Ryo Mukai et al., ICASSP 2006, pp. 969-972.
Blind Source Separation Based on a Fast-Convergence Algorithm Combining ICA and Beamforming, Hiroshi Saruwatari et al., IEEE Transactions on Audio, Speech, and Language Processing, vol. 14, No. 2, Mar. 2006, pp. 666-678.
Geometrically Constrained Independent Component Analysis, Mirko Knaak et al., IEEE Transactions on Audio, Speech, and Language Processing, vol. 15, No. 2, Feb. 2007, pp. 715-726.
Enhanced Robot Audition Based on Microphone Array Source Separation with Post-Filter, Jean-Marc Valin et al.

* cited by examiner

SOUND SOURCE SEPARATION SYSTEM WHICH CONVERGES A SEPARATION MATRIX USING A DYNAMIC UPDATE AMOUNT BASED ON A COST FUNCTION

BACKGROUND OF THE INVENTION

1. Field of the Invention

The present invention relates to a sound source separation system.

2. Description of the Related Art

As a method of separating a sound source without information of a transfer system according to a separation method based on an inverse filter, blind source separation (BSS) is suggested (see Reference Documents 1 to 4). As the BSS, sound source separation based on a decoration based source separation (DSS), an independent component analysis (ICA) and a higher-order DSS (HDSS), geometric constrained source separation (GSS) obtained by adding geometric information to these method, geometric constrained ICA (GICA) and a geometric constrained HDSS (GHDSS) are known. Hereinafter, the overview of the BSS will be described.

If the frequency characteristics of M sound source signals are $s(\omega)=[s_1(\omega), s_2(\omega), \ldots, s_N(\omega)]^T$ (T denotes transposition), the characteristics of input signals of N ($\leq$M) microphones $x(\omega)=[x_1(\omega), x_2(\omega), \ldots, x_N(\omega)]^T$ are expressed by Equation (1) using a transfer function matrix $H(\omega)$. The element $H_{ij}$ of the transfer function $H(\omega)$ represents a transfer function from the sound source i to the microphone j.

$$x(\omega)=H(\omega)s(\omega) \quad (1)$$

A sound source separation problem is expressed by Equation (2) using a separation matrix $W(\omega)$.

$$y(\omega)=W(\omega)x(\omega) \quad (2)$$

A sound source separation process is formalized by obtaining the separation matrix $W(\omega)$ which becomes $y(\omega)=s(\omega)$. If the transfer function matrix $H(\omega)$ is already known, the separation matrix $W(\omega)$ is computed using a pseudo-inverse matrix $H^+(\omega)$. However, actually, the transfer function matrix $H(\omega)$ is hardly known. The BSS obtains $W(\omega)$ in a state in which $H(\omega)$ is not known.

1. BSS (Offline Process)

The general method of the BSS is described by Equation (3) as a process of obtaining y which minimizes a cost function J(y) for evaluating a separation degree.

$$W_{Bss}=\text{argmin}_w[J(y)]=\text{argmin}_w[J(Wx)] \quad (3)$$

The cost function J(y) is changed according to the method and is calculated by Equation (4) using Frobenius norm (representing the square sum of the absolute values of all elements of the matrix) on the basis of a correlation matrix $R_{yy}=E[yy^H]$ of y according to the DSS.

$$J_{DSS}(W)=\|R_{yy}-Diag[R_{yy}]\|^2 \quad (4)$$

According to the ICA using K-L information amount, the cost function J is calculated by Equation (5) on the basis of a simultaneous probability density function (PDF) p(y) of y and a peripheral PDF $q(y)=\Pi_k p(y_k)$ of y (see Reference Document 5).

$$J_{ICA}(W)=\int dy \, p(y) \log\{p(y)/q(y)\} \quad (5)$$

W satisfying Equation (3) is determined by iteration computation according to a gradient method expressed by Equation (6) on the basis of a matrix J' ($W_k$) representing the direction of W in which the gradient of J(W) is most rapid in the periphery of J($W_k$) (k is the number of times of iteration) and a step-size parameter $\mu$.

$$W_{k+1}=W_k-\mu J'(W_t) \quad (6)$$

The matrix J' ($W_k$) is calculated by a complex gradient calculating method (see Reference Document 6). According to the DSS, the matrix J' (W) is expressed by Equation (7).

$$J'_{DSSoff}(W)=2[R_{yy}-Diag[R_{yy}]]WR_{xx} \quad (7)$$

According to the ICA, the matrix J' (W) is expressed by Equation (8) according to the matrix $R_{\phi(y)y}=E[\phi(y)y^T]$ and the function $\phi(y)$ defined by Equations (9) and (10).

$$J'_{ICAoff}(W)=[R_{\phi(y)y}-I][W^{-1}]^T \quad (8)$$

$$\phi(y)=[\phi(y_1),\phi(y_2),\ldots,\phi(y_N)]^T \quad (9)$$

$$\phi(y_i)=-(\partial/\partial y_i) \log p(y_i) \quad (10)$$

2. Adaptive BSS

According to the adaptive BSS, expectation calculation of a restarting process is omitted and immediate data is used. In more detail, $E[yy^H]$ is converted into $yy^H$. The updated equation is equal to Equation (6) and the number of times of iteration "k" includes the meaning as expressing a time. In an offline process, in order to improve precision, the number of times of iteration may be increased by a small step size, but, if this method is employed in the adaptive process, an adaptive time is increased and the quality of performance deteriorates. Accordingly, the adjustment of a step-size parameter $\mu$ of the adaptive BSS is more important than the offline BSS. The DSS of the adaptive BSS and the matrix J' of the ICA are expressed by Equations (11) and (12), respectively. The ICA is described according to a method of using an updating method based on a natural gradient according to a method which focuses on only an off-diagonal element of a correlation matrix (see Reference Document 7)).

$$J'_{DSS}(W)=2[yy^H Diag[yy^H]]W_{xx}^H \quad (11)$$

$$J'_{ICA}(W)=[\phi(y)y^H-Diag[\phi(y)y^H]]W \quad (12)$$

3. BSS (GBSS) with Constraint Condition Using Geometric Information

A method of solving permutation problem and a scaling problem which occur in the ICA using geometric information (positions of the microphone and the sound source) is suggested (see Reference Documents 8 to 11). According to the GSS, a value obtained by synthesizing a geometric constraint error and a separation error is used as a cost function. For example, the cost function J(W) is decided according to Equation (13) on the basis of a linear constraint error $J_{LC}(W)$ based on the geometric information, a separation system error $J_{ss}(W)$ and a normalization coefficient $\lambda$.

$$J(W)=J_{LC}(W)+\lambda J_{ss}(W) \quad (13)$$

As the linear constraint error $J_{LC}(W)$, a difference $J_{LCDS}(W)$ from a coefficient at a delay sum beamforming method expressed by Equation (14) or a difference $J_{LCNULL}(W)$ from a coefficient at a null beamforming method expressed by Equation (15).

$$J_{LCDS}(W)=\|Diag[WD-I]\|^2 \quad (14)$$

$$J_{LCNULL}(W)=\|WD-I\|^2 \quad (15)$$

In the GSS, as the separation system error $J_{ss}(W)$, $J_{DSS}(W)$ of Equation (4) is employed (see Reference Document 12). In addition, as the separation system error $J_{ss}(W)$, $J_{ICA}(W)$ of Equation (5) may be employed. In this case, an adaptive ICA (GICA) with linear constraint using the geometric information is obtained. This adaptive GICA is a weak-constraint method which permits a linear constraint error and is different from a strong-constraint method using linear constraint as an absolute condition described in Reference Document 11.

[Reference Document 1] L. Parra and C. Spence, Convolutive blind source separation of non-stationary source, IEEE Trans. on Speech and Audio Proceeding, vol. 8, no. 3, 2000, pp. 320-327

[Reference Document 2] F. Asano, S. Ikeda, M. Ogawa, H. Asoh and N. Kitawaki, Combined Approach of Array Processing and Independent Component Analysis for Blind Separation of Acoustic Signals, IEEE Trans. on Speech and Audio Processing, vol. 11, no. 3, 2003, pp. 204-215

[Reference Document 3] M. Miyoshi and Y. Kaneda, Inverse Filtering of Room Acoustics, IEEE Trans. on Acoustic Speech and Signal Processing, vol. ASSP-36, no. 2, 1988, pp. 145-152

[Reference Document 4] H. Nakajima, M. Miyoshi and M. Tohyama, Sound field control by Indefinite MINT Filters, IEICE Trans., Fundamentals, vol. E-80A, no. 5, 1997, pp. 821-824

[Reference Document 5] S. Ikeda and M. Murata, A method of ICA in time-frequency domain, Proc. Workshop Indep. Compom. Anal. Signal. 1999, pp. 365-370

[Reference Document 6] D. H. Brandwood, B. A, A complex gradient operator and its application in adaptive array theory, Proc. IEE Proc., vol. 130, Pts. F and H, No. 1, 1983, pp. 11-16

[Reference Document 7] S. Amari, Natural gradient works efficiently in learning, newral Compt., vol. 10, 1988, pp. 251-276

[Reference Document 8] L. Parra and C. Alvino, Gepmetric Source Separation: Merging Convultive Source Separation with Geometric Beamforming, IEEE Trans. on Speech and Audio Processing, vol. 10, no. 6, 2002, pp. 352-362

[Reference Document 9] R. Mukai, H. Sawada, S. Araki and S. Makino, Blind Source Separation of many signals in the frequency domain, in Proc. of ICASSP2006, vol. V, 2006, pp. 969-972

[Reference Document 10] H. Saruwatari, T. Kawamura, T. Nishikawa, A. Lee and K. Shikano, Blind Source Separation Based on a Fast Convergence Algorithm Combining ICA and Beamforming, IEEE Trans. on Speech and Audio Processing, vol. 14, no. 2, 2006, pp. 666-678

[Non-Patent Document 11] M. Knaak, S. Araki and S. Makino, Geometrically Constrained Independent Component Analysis, IEEE Trans. on Speech and Audio Processing, vol. 15, no. 2, 2007, pp. 715-726

[Non-patent Document 12] J. Valin, J. Rouat and F. Michaud, Enhanced Robot Audition Based on Microphone Array Source Separation with Post-Filter, Proc. of 2004 IEE/RSJ IROS, 2004, pp. 2123-2128

SUMMARY OF THE INVENTION

However, according to the conventional method, since the step-size parameter $\mu$ (see Equation (6)) is fixed, there are two problems from the viewpoint of the convergence of a minimum value $J(W_0)$ ($W_0$: optimal separation matrix) of the cost function $J(W)$.

As a first problem, since the update amount $\Delta W(=\mu J'(W_k))$ of the separation matrix W is decided regardless of the current value $J(W_k)$ of the cost function, the update amount $\Delta W$ is improper from the viewpoint of improvement of a convergence rate and convergence precision. For understanding of the first problem, FIG. 10(a) conceptually shows a variation in cost function $J(W)$ according to the separation matrix W. If the convergence is insufficient (that is, if the cost function $J(W)$ is separated from the minimum value $J(W_0)$), the update amount $\Delta W$ may become too little from the viewpoint of the improvement of the convergence rate. In contrast, if the convergence is sufficient (that is, if the cost function $J(W)$ is close to the minimum value $J(W_0)$), the update amount $\Delta W$ may become excessive from the viewpoint of the improvement of the convergence precision.

In a second problem, since the update amount $\Delta W$ is proportional to a differential value $J'(W)$ of the cost function $J(W)$, the update amount $\Delta W$ is improper from the viewpoint of the improvement of the convergence rate and the convergence precision. For understanding of the second problem, FIG. 10(b) conceptually shows a variation in different cost functions $J_1(W)$ and $J_2(W)$ according to the separation matrix W. In the cost function $J_1(W)$, since a differential value $J'(W)$ sensitively varies according to the separation matrix W, the update amount may become excessive from the viewpoint of the improvement of the convergence precision. In contrast, in the cost function $J_2(W)$, since a differential value $J'(W)$ does not sensitively vary according to the separation matrix W, the update amount may become too little from the viewpoint of the improvement of the convergence rate.

Accordingly, it is an object of the present invention to provide a system which is capable of separating sound source signals with high precision while improving a convergence rate and convergence precision.

According to a first aspect of the present invention, there is provided a sound source separation system which includes a plurality of microphones and separates a plurality of sound sources on the basis of input signals from the plurality of microphones, the system including a first processing element which recognizes a cost function for evaluating separation degrees of the sound source signals. The cost function being defined by a separation matrix representing independency between the input signals and the sound source signals. The system further including a second processing element which recognizes the separation matrix when the cost function becomes a minimum value as an optimal separation matrix by iteratively performing a process of updating a current separation matrix such that a next value of the cost function recognized by the first processing element becomes closer to the minimum value than a current value so as to decide a next separation matrix, and adjusts an update amount from the current value of the separation matrix to the next value to be increased as the current value of the cost function is increased and to be decreased as a current gradient of the cost function is rapid.

According to the sound source separation system of the first aspect, a process of updating the current separation matrix to the next separation matrix is iteratively performed such that the next value (the value of the current separation matrix) of the cost function becomes closer to the minimum value than the current value (the value of the previous separation matrix). The update amount of the separation matrix is adjusted to be increased as the current value of the cost function is increased and is adjusted to be decreased as the current gradient of the cost function is rapid. Accordingly, in a "first state" in which the convergence of the current value of the cost function is insufficient and the current gradient of the cost function is slow, the update amount of the separation matrix is adjusted to be properly increased from the viewpoint of the improvement of a convergence rate. In addition, in a "second state" in which the convergence of the current value of the cost function is insufficient and the current gradient of the cost function is rapid, the update amount of the separation matrix is adjusted to be properly increased from the viewpoint of the improvement of the convergence rate similar to the first state and the update amount of the separation matrix is adjusted to be further decreased than the first state from the viewpoint of the improvement of the convergence precision. In a "third state" in which the convergence of the current value of the cost function is sufficient and the current gradient of the cost function is rapid, the update amount of the separation matrix is adjusted to be properly decreased from the viewpoint of the improvement of the convergence precision. In addition, in a "fourth state" in which the convergence of the current value of the cost function is sufficient and the current gradient of the cost function is slow, the update amount of the separation matrix is adjusted to be properly decreased from the viewpoint of the improvement of the convergence precision similar to the third state and the update amount of the separation matrix is adjusted to be further increased than the third state from the viewpoint of the improvement of the convergence rate. In addition, the optimal separation matrix (the separation matrix in which the cost function is likely to become the minimum value) is recognized by the iteration of the above-described process. Accordingly, on the basis of the input signals from the plurality of microphones and the optimal separation matrix, it is possible to separate the sound source signals with high precision, while improving the convergence rate and the convergence precision.

The "recognition" of information by the components of the sound source separation system indicates all information processes for preparing information in order to perform a calculating process requiring information such as reading of information from a memory, retrieving of information from a database, reception of information, calculation, estimation, setting or determination of information based on basic information, and storage of calculated information in a memory.

According to a second aspect of the present invention, in the sound source separation system of the first aspect, the second processing element adjusts the update amount of the separation matrix according a multi-dimensional Newton's method.

According to the sound source separation system of the second aspect, on the basis of input signals from the plurality of microphones and the optimal separation matrix, it is possible to separate the sound source signals according to the Newton's method with high precision while improving a convergence rate and convergence precision. Accordingly, on the basis of input signals from the plurality of microphones and the optimal separation matrix, it is possible to separate the sound source signals with high precision while improving a convergence rate and convergence precision.

BRIEF DESCRIPTION OF THE DRAWINGS

FIGS. 9(a)-9(c) are views showing the waveform of a sound source signal separated according to a GSS-AS.

DESCRIPTION OF THE PREFERRED EMBODIMENTS

A sound source separation system according to an embodiment of the present invention will be described with reference to the accompanying drawings.

Figure 1:
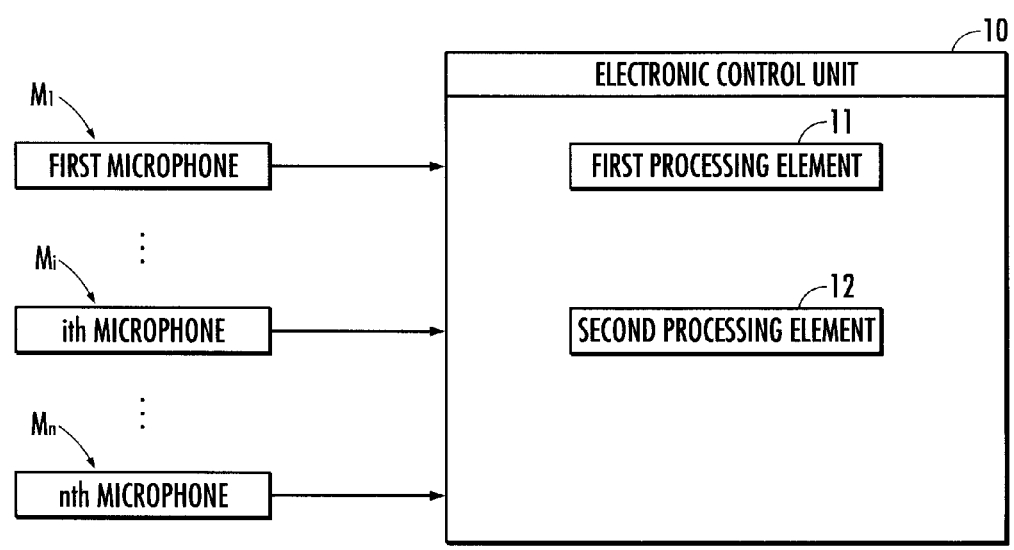
FIG. 1 is a view showing the configuration of a sound source separation system according to the present invention.

The sound source separation system shown in FIG. 1 includes a plurality of microphones $M_i$ (i=1, 2, ..., n) and an electronic control unit (an electronic circuit such as a CPU, a ROM, a RAM, an I/O circuit or an A/D conversion circuit) 10.

The electronic control unit 10 separates a plurality of sound source signals on the basis of input signals from the plurality of microphones $M_i$. The electronic control unit 10 includes a first processing element 11 and a second processing element 12. The first processing element 11 and the second processing element 12 may be composed of the same CPU or different CPUs. The first processing element 11 is defined by a separation matrix W representing independency between the input signals from the microphones $M_1$ and the sound source signals and recognizes a cost function J(W) for evaluating the separation degree of the sound source signals. The second processing element 12 performs a process of deciding a next separation matrix $W_{k+1}$ by updating a current separation matrix $W_k$ such that a next value $J(W_{k+1})$ of the cost function recognized by the first processing element 11 be closer to a minimum value $J(W_O)$ than a current value $J(W_k)$. The second processing element 12 iteratively performs this process so as to recognize a separation matrix when the cost function becomes the minimum value, as an optimal separation matrix $W_O$. The second processing element 12 adjusts an update amount $\Delta W_k$ from the current separation matrix $W_k$ to the next separation matrix $W_{k+1}$ by the current value $J(W_k)$ of the cost function and a current gradient $\partial J(W_k)/\partial w$.

Figure 2:
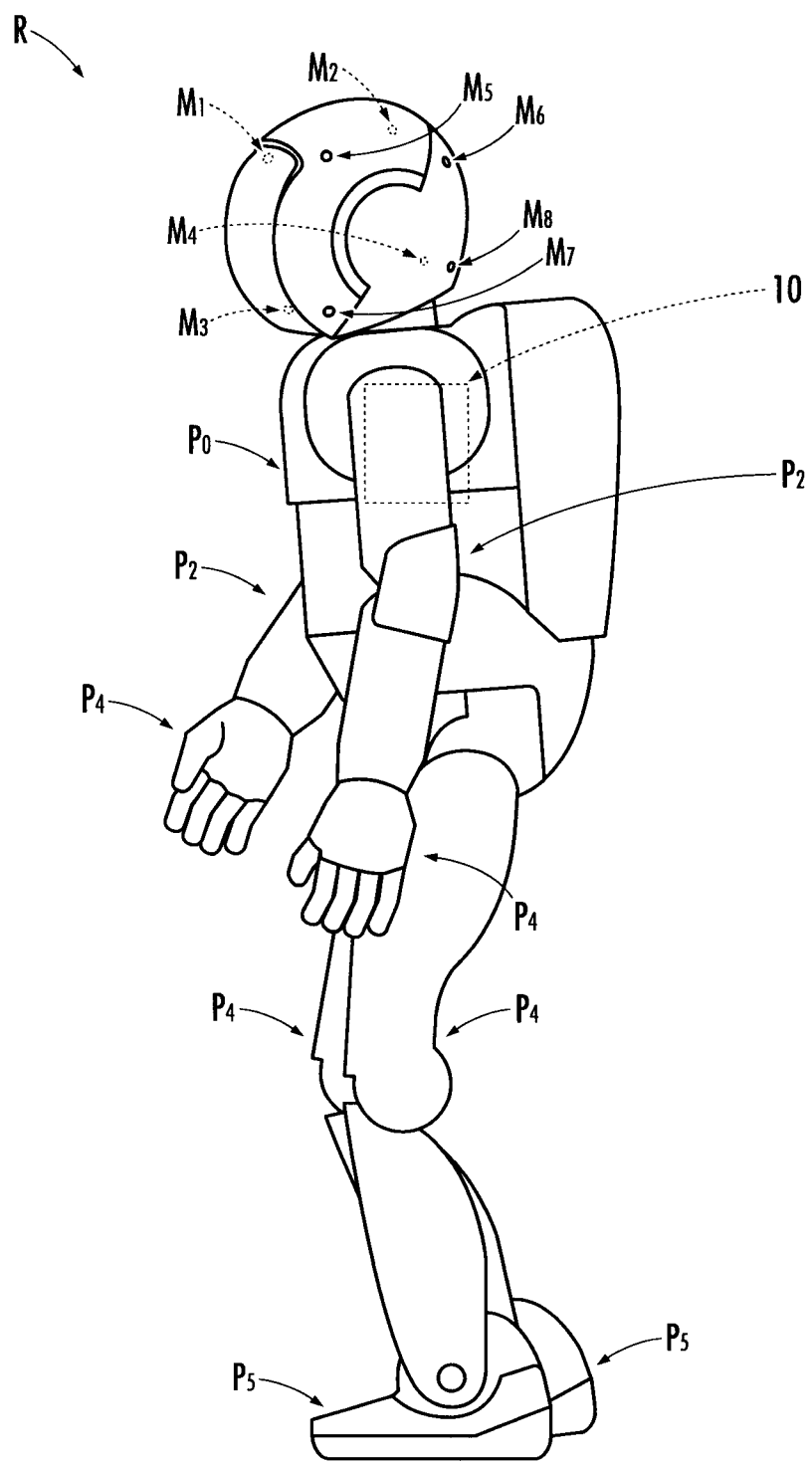
FIG. 2 is a view showing a robot in which the sound source separation system according to the present invention is mounted.

The microphones $M_i$ are provided at the left and right sides of a head portion P1 of a robot R, in which the electronic control unit 10 is mounted, four by four, as shown in FIG. 2. The microphones $M_1$ to $M_4$ are provided at a front upper part, a rear upper part, a front lower part, and a rear lower part of the right side of the head portion P1. The microphones $M_5$ to $M_8$ are provided at a front upper part, a rear upper part, a front lower part, and a rear lower part of the left side of the head portion P1. The sound source separation system may be mounted in any machine or device tangent to an environment in which a plurality of sound sources exist, such as a vehicle (four-wheel vehicle), in addition to the robot R. The number and the arrangement of the microphones $M_i$ may be arbitrarily changed. The robot R is a legged mobile robot and includes a base body P0, the head portion P1 provided above the base body P0, left and right arm portions P2 which extend from the both sides of the upper part of the base body P0, hand portions P3 connected to the front ends of the left and right arm portions P2, left and right leg portions P4 which extend downward from the lower part of the base body P0, and foot portions P5 connected to the left and right leg portions P4, similar to human. The base body P0 is composed of an upper part and a lower part which are vertically connected so as to be rotated relative to each other by rotation of a yawing axis. The head portion P1 is rotated or moved by the rotation of the yawing axis with respect to the base body P0. Each of the arm portions P2 has a rotation freedom degree of uniaxial to triaxial rotation in a shoulder joint mechanism, an elbow joint mechanism and a carpus joint mechanism, and each of the hand portions P3 includes five finger mechanisms which extend from a hand palm portion and corresponds to a thumb, an index finger, a middle finger, a third finger and a little finger of the human and can perform an object holding action. Each of the leg portions P4 has a rotation freedom degree of uniaxial to triaxial rotation in a hip joint mechanism, a knee mechanism and an ankle joint mechanism. The robot R can perform a proper action, that is, the movement of the left and right leg portions P4, on the basis of the sound source separation result.

Figure 3:
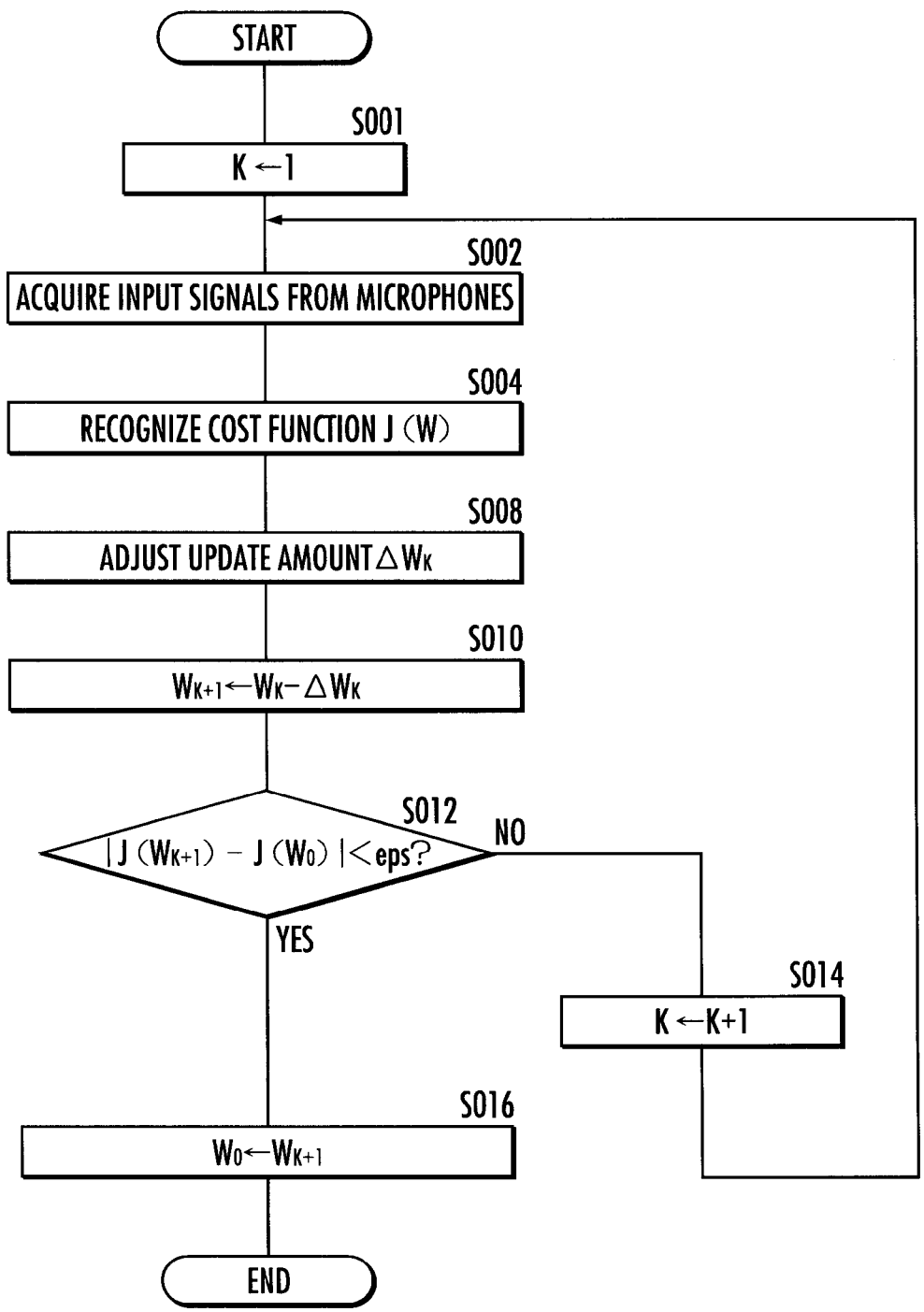
FIG. 3 is a flowchart showing the function of the sound source separation system according to the present invention.

The function of the sound source separation system having the above-described configuration will be described. The index k representing the number of times of update of the separation matrix W is set to "1" (FIG. 3/S001) and the input signals from the microphones $M_i$ are acquired by the electronic control unit 10 (FIG. 3/S002). The cost function J(W) for evaluating the separation degree of the sound source signals are defined or recognized by the first processing element 11 (FIG. 3/S004 (see Equations (4) and (5)). A current update amount $W_k$ of the separation matrix is adjusted by an adaptive step-size (AS) method (FIG. 3/S008). In more detail, the cost function J(W) in the vicinity of the current value $J(W_k)$ of the cost function is linearly approximated as expressed by Equation (16) according to the complex gradient calculating method.

$$J(W) \approx J(W_k) + 2MA[\partial J(W_k)/\partial W, W - W_k], \; MA[A,B] = Re[\Sigma_{ij} a_{ij} b_{ij}] \quad (16)$$

Figure 4:
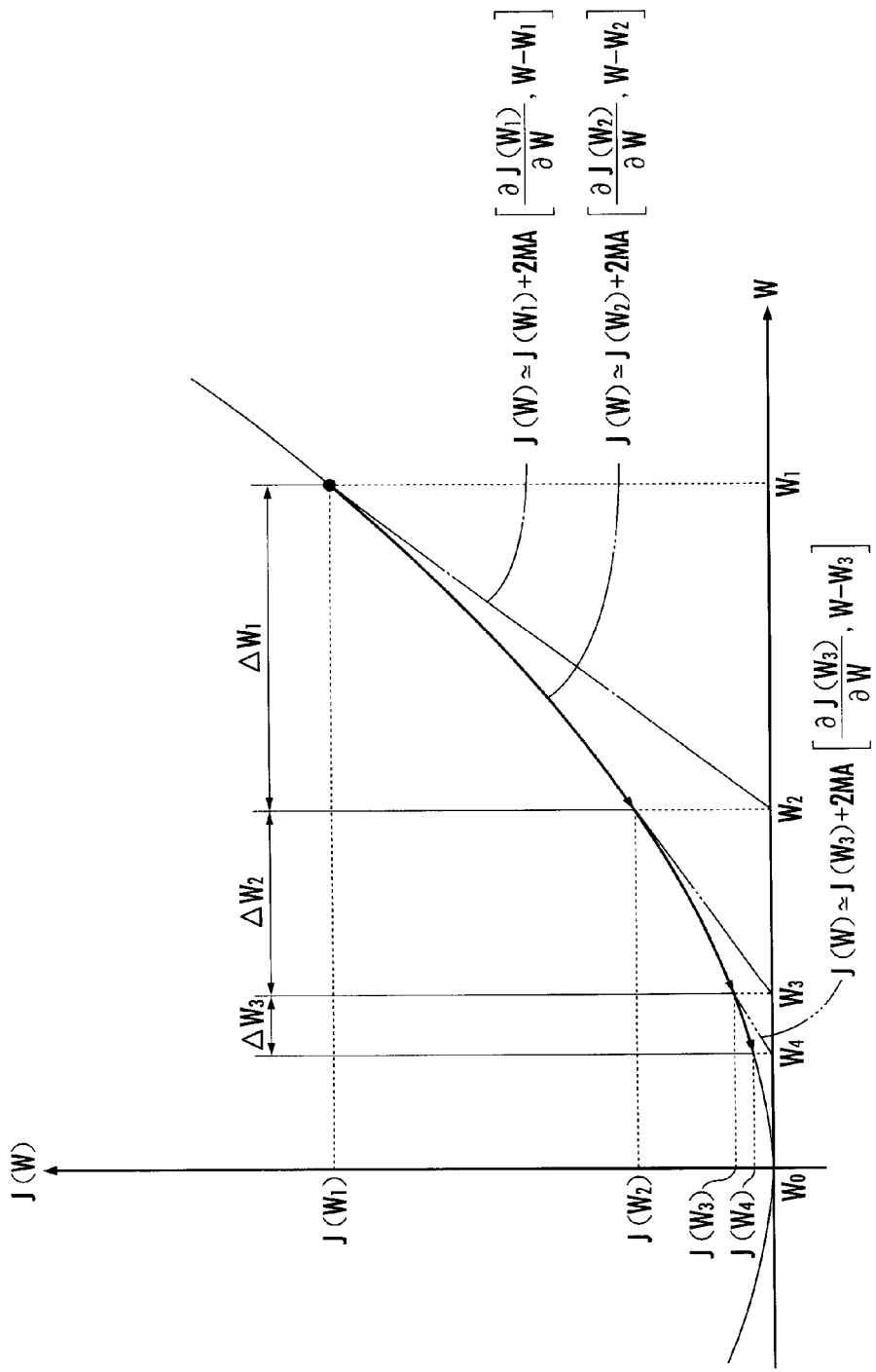
FIG. 4 is a view showing the improvement of a convergence rate and convergence precision according to a cost function.

As conceptually shown in FIG. 4, if the cost function J(W) varies according to the separation matrix W, the cost function J(W) is approximated as a linear function (see an alternate long and short dashes line, an alternate long and two short dashed line, and an alternate long and three short dashes line) sloped by the current gradient $\partial J(W_k)/\partial W$ of the cost function J(W) via the current value $J(W_k)$ of the cost function.

An optimal current step-size parameter $\mu_k$ is calculated according to a multi-dimensional Newton's method on the basis of a relational expression $W = W_k - \mu J'(W_k)$ such that an approximate cost function J(W) becomes 0 (=minimum value $J(W_0)$ of the cost function). The optimal current step-size parameter $\mu_k$ is expressed by Equation (17). The current update amount $\Delta W_k$ of the separation matrix W is decided by $\mu_k J'(W_k)$.

$$\mu_k = J(W_k)/2MA[\partial J(W_k)/\partial W, J'(W_k)] \quad (17)$$

The current separation matrix $W_k$ is adjusted by the current update amount $\Delta W_k$ by the second processing element 12 such that the next separation matrix $W_{k+1} (=W_k - \Delta W_k)$ is decided (FIG. 3/S010). Accordingly, as denoted by an arrow of FIG. 4, the separation matrix $W_k$ is sequentially updated such that the value $J(W_k)$ of the cost function is gradually close to the minimum value $J(W_0)$ (=0).

As described below, the AS method may be applied to various BSSs.

1. Adaptive Step-Size DSS (DSS-AS)

An algorithm in which the present method is applied to the DSS is defined by Equations (101) to (105).

$$y = W_k x \quad (101),$$

$$E = yy^H - Diag[yy^H] \quad (102),$$

$$J' = 2EW_k xx^H \quad (103),$$

$$\mu = \|E\|^2/2\|J'\|^2 \quad (104),$$

$$W_{k+1} = W_k - \mu J' \quad (105)$$

2. Adaptive Step-Size ICA (ICA-AS)

An algorithm in which the present method is applied to the ICA is defined by Equations (201) to (208).

$$y = W_k x \quad (201),$$

$$E = \phi(y)y^H - Diag[\phi(y)y^H] \quad (202),$$

$$J_{ICA}' = EW_k \quad (203),$$

$$J' = [E\phi^-(y)x^H]^* \quad (204),$$

$$\phi^-(y) = [\phi^-(y_1), \phi^-(y_2), \ldots, \phi^-(y_N)]^T \quad (205)$$

$$\phi^-(y_i) = \phi(y_i) + y_i(\partial \phi(y_i)/\partial y_i) \quad (206)$$

$$\mu = \|E\|^2/2MA[J', J_{ICA}'] \quad (207),$$

$$W_{k+1} = W_k - \mu J' \quad (208)$$

3. Adaptive Step-Size Higher-Order DSS (HDSS-AS)

An algorithm in which the present method is applied to the higher-order DSS is defined by Equations (301) to (305).

$$Y = W_k x \quad (301)$$

$$E = \phi(y)y^H - Diag[\phi(y)y^H] \quad (302),$$

$$J' = [E\phi^-(y)x^H]^* \quad (303),$$

$$\mu = \|E\|^2/2\|J'\|^2 \quad (304),$$

$$W_{k+1} = W_k - \mu J' \quad (306)$$

4. Adaptive Step-Size GSS (GSS-AS)

An algorithm in which the present method is applied to the GSS is defined by Equations (401) to (408).

$$y = W_k x \quad (401),$$

$$E_{ss} = yy^H - Diag[yy^H] \quad (402),$$

$$J_{ss}' = 2E_{ss} W_k xx^H \quad (403),$$

$$\mu_{ss} = \|E_{ss}\|^2/2\|J_{ss}'\|^2 \quad (404),$$

$$E_{LC} = WD - I \quad (405),$$

$$J_{LC}' = E_{LC} D^H \quad (406),$$

$$\mu_{LC} = \|E_{LC}\|^2/2\|J_{LC}'\|^2 \quad (407),$$

$$W_{k+1} = W_k - \mu_{LC} J_{LC}' - \mu_{ss} J_{ss}' \quad (408)$$

5. Adaptive Step-Size GICA (GICA-AS)

An algorithm in which the present method is applied to the GICA is defined by Equations (501) to (509).

$$y = W_k x \quad (501),$$

$$E_{ICA} = \phi(y)y^H - Diag[\phi(y)y^H] \quad (502),$$

$$J_{ICA}' = E_{ICA} W_t \quad (503),$$

$$J' = [E_{ICA} \phi^-(y)x^H]^* \quad (504),$$

$$\mu_{ICA} = \|E_{ICA}\|^2/2MA\|J', J_{ICA}'\|^2 \quad (505),$$

$$E_{LC} = WD - I \quad (506),$$

$$J_{LC}' = E_{LC}D^H \quad (507),$$

$$\mu_{LC} = \|E_{LC}\|^2 / 2\|J_{LC}'\|^2 \quad (508),$$

$$W_{k+1} = W_k - \mu_{LC}J_{LC}' - \mu_{ICA}J_{ICA}' \quad (509)$$

6. Adaptive Step-Size GHDSS (GHDSS-AS)

An algorithm in which the present method is applied to the GHDDS is defined by replacing a cost function $E_{ss}$ expressed by Equation (402) of Equations (401) to (408) defining the GSS-AS with a cost function $E_{ICA}$ expressed by Equation (502) defining the GICA-AS.

It is determined whether a deviation norm (Frobenius norm) between the next separation matrix $W_{k+1}$ and the optimal separation matrix $W_0$ is less than an allowable value eps (FIG. 3/S012). If the result of determination is No (FIG. 3/S012 . . . NO), the index k is increased by "1" by the second processing element 12 (FIG. 3/S014), and the acquisition of the input signals from the microphones, the evaluation of the cost function J(W), the adjustment of the update amount $\Delta W_k$ and the processing of the next separation matrix $W_{k+1}$ are performed again (FIG. 3/see S002, S004, S008, S010 and S012). In contrast, if the result of determination is Yes (FIG. 3/S012 . . . YES), the next separation matrix W is decided as the optimal separation matrix $W_0$ (FIG. 3/S016). The sound source signals $y(=W_0 \cdot x)$ are separated on the basis of the optimal adaptive matrix $W_0$ and the input signals x.

According to the sound source separation system having the above-described function, a process of updating the current separation matrix $W_k$ to the next separation matrix $W_{k+1}$ is iteratively performed such that the next value $J(W_{k+1})$ of the cost function becomes closer to the minimum value than the current value $J(W_k)$ (FIG. 3/S008, S010, S012 and S014, see the arrow of FIG. 4). The update amount $\Delta W_k$ of the separation matrix W is adjusted to be increased as the current value $J(W_k)$ of the cost function is increased and is adjusted to be decreased as the current gradient $\partial J(W_k)/\partial W$ of the cost function is rapid (see FIG. 4). Accordingly, in a first state in which the convergence of the current value $J(W_k)$ of the cost function is insufficient and the current gradient $\partial J(W_k)/\partial W$ of the cost function is slow, the update amount $\Delta W_k$ of the separation matrix is adjusted to be properly increased from the viewpoint of the improvement of a convergence rate. In addition, in a second state in which the convergence of the current value $J(W_k)$ of the cost function is insufficient and the current gradient $\partial J(W_k)/\partial W$ of the cost function is rapid, the update amount $\Delta W_k$ of the separation matrix is adjusted to be properly increased from the viewpoint of the improvement of the convergence rate similar to the first state and the update amount $\Delta W_k$ of the separation matrix is adjusted to be further decreased than the first state from the viewpoint of the improvement of the convergence precision. In a third state in which the convergence of the current value $J(W_k)$ of the cost function is sufficient and the current gradient $\partial J(Wk)/\partial W$ of the cost function is rapid, the update amount $\Delta W_k$ of the separation matrix is adjusted to be properly decreased from the viewpoint of the improvement of the convergence precision. In addition, in a fourth state in which the convergence of the current value $J(W_k)$ of the cost function is sufficient and the current gradient $\partial J(Wk)/\partial W$ of the cost function is slow, the update amount $\Delta W_k$ of the separation matrix is adjusted to be properly decreased from the viewpoint of the improvement of the convergence precision similar to the third state and the update amount $\Delta W_k$ of the separation matrix is adjusted to be further increased than the third state from the viewpoint of the improvement of the convergence rate. In addition, the optimal separation matrix (the separation matrix in which the cost function is likely to become the minimum value) $W_0$ is recognized by the iteration of the above-described process. Accordingly, on the basis of the input signals x from the plurality of microphones $M_i$ (see FIGS. 1 and 2) and the optimal separation matrix $W_0$, it is possible to separate the sound source signals $y(=W_0 \cdot x)$ with high precision, while improving the convergence rate and the convergence precision.

The performance experiment result of the sound source separation system will be described. The input signals $x_i(t)$ of the microphones $M_i$ are synthesized as expressed by Equation (18) on the basis of an impulse response $h_{ji}(t)$ from a $j^{th}$ sound source to the microphones $M_i$, a sound source signal $s_j(t)$ of the $j^{th}$ sound source, and the background noise $n_i(t)$ of the microphones $M_i$.

$$x_i(t) = \Sigma_j h_{ji}(t) s_j(t) + n_i(t) \quad (18)$$

Figure 5:
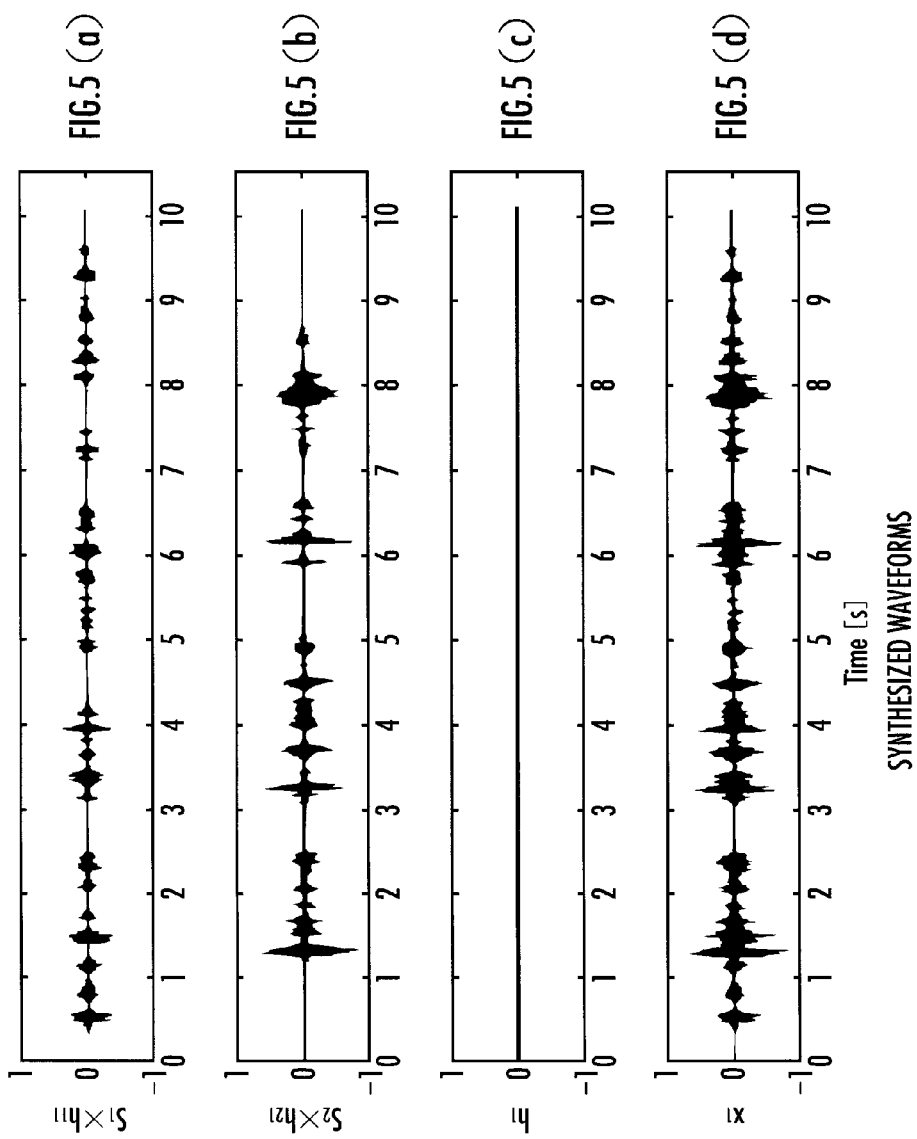
FIG. 5(a) is a view showing the waveform of a first sound source signal (male voice).
FIG. 5(b) is a view showing the waveform of a second sound source signal (female voice).
FIG. 5(c) is a view showing the waveform of background noise.
FIG. 5(d) is a view showing the waveform of a synthesized input signal.
Figure 6:
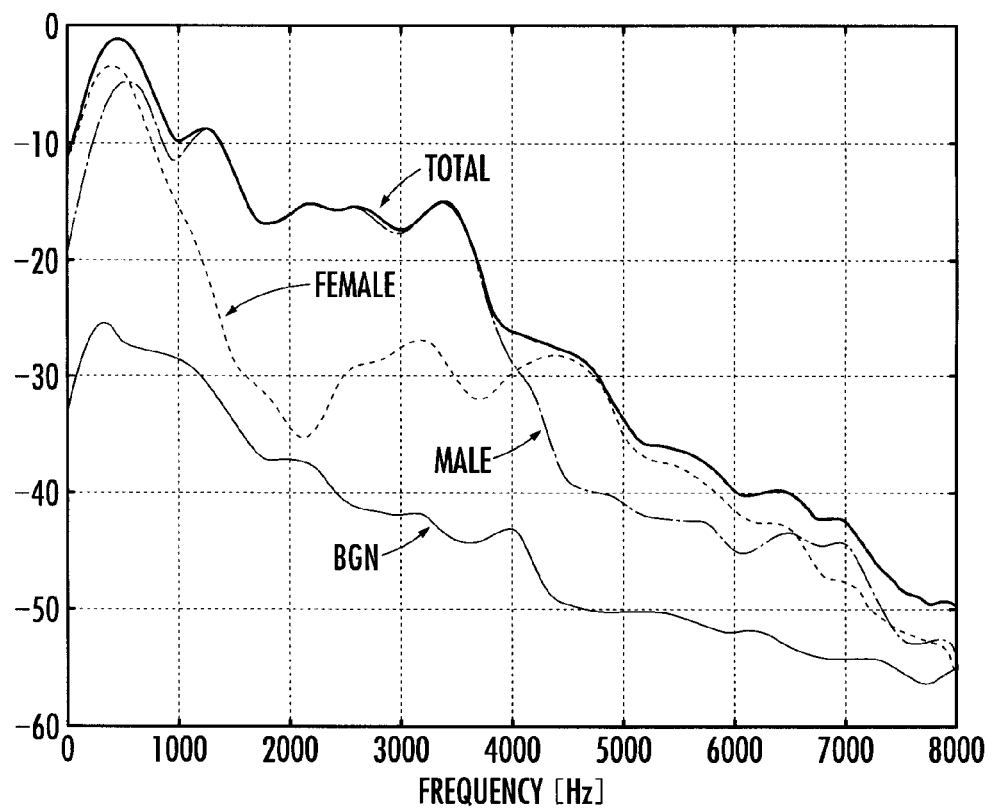
FIG. 6 is a view showing the frequency characteristics of signals.

In the experiment, two clean voices were used as the sound source signal $s_j(t)$. In more detail, a male voice as a first sound source signal shown in FIG. 5(a) and a female voice as a second source signal shown in FIG. 5(b) were used. As the impulse response $h_{ji}(t)$, an actual measurement value of an experimental laboratory was adopted. The size of the experimental laboratory has a vertical length of 4.0 [m], a horizontal length of 7.0 [m] and a height of 3.0 [m], and an echo time is about 0.2 [s]. One surface of the walls of the experimental laboratory is made of glass and generates strong reflection. As the background noise $n_i(t)$, an actual measurement value shown in FIG. 5(c) of the experimental laboratory was employed. In FIG. 5(d), the synthesized input signal $x_i(t)$ is shown. FIG. 6 shows the frequency characteristics of the signals. The background noise has a level lower than that of the sound source by about −10 to −20 dB. The separation result was evaluated on the basis of a separation result signal y, a noise signal $n^\#$ included in the signal y, a separation result signal $s^\#$ of the input signal when only a target sound source exists, and a SNR calculated according to Equation (19). This indicates that the sound source is separated at higher precision as the SNR is increased.

$$SNR \text{ [dB]} = 10\text{Log}_{10}\left[(1/T)\sum_{t=1-T} |y(t)|^2 / |n^\#(t)|^2\right], \quad (19)$$

$$n^\# \equiv y - s^\#$$

The separation result was further evaluated on the basis of an average correlation coefficient CC calculated according to Equation (20) in a time-frequency domain. This indicates that the sound source is separated at higher precision as the average correlation coefficient CC is decreased.

$$CC \text{ [dB]} = 10\text{Log}_{10}\left[(1/F)\sum_{f=1-F} CC\omega(2\Pi f)\right], \quad (20)$$

$$CC\omega(\omega) \equiv \left|\sum_{t=1-T} y_1*(t) \cdot y_2(t)\right| / (Y_1(\omega)Y_2(\omega)),$$

$$Y_1(\omega) \equiv \left(\sum_{t=1-T} |y_1(\omega, t)|^2\right)^{1/2},$$

$$Y_2(\omega) \equiv \left(\sum_{t=1-T} |y_2(\omega, t)|^2\right)^{1/2}$$

The separation matrix W was initiated according to Equation (21) using a transfer function matrix D having a transfer function of a direct sound component as an element.

$$W_{DS}=\text{Diag}[D^H D]^{-1}D^H \quad (21)$$

In addition, the separation matrix W may be initiated according to Equation (22) or (23) instead of Equation (21).

$$W_I = I \quad (22)$$

$$W_{NULL} = D^+ (=[D^H D]^{-1} D^H) \quad (23)$$

$W_{DS}$ indicates that the coefficient of a minimum norm weighted delay sum BF is used as an initial value and $W_{NULL}$ indicates that the coefficient of a null BF is used as an initial value. Since $W_{NULL}$ has a higher initial separation degree than $W_{DS}$ but has low robustness for a variation, an initial value in which $W_{DS}$ has higher performance is given if echo is strong or a geometric information error is large.

With respect to a method without geometric constraint, a scaling problem is solved by normalizing the sizes of row vectors of the separation matrix. A permutation problem is considered to be solved by the initial value and a supplementary process is omitted. A normalization coefficient λ necessary for the conventional geometric constrained BBS was "$\|x^H X\|^{-2}$" in the GSS and the GHDSS according to Document 12 and was "1" because normalization is made in a natural gradient in the GICA. In addition, a non-linear function $\phi(y_i)$ used in the methods other than the DSS was defined by Equation (24) on the basis of a scaling parameter η (which is "1" in the present experiment).

$$\phi(y_i) = \tanh(\eta|y_i|)\exp(j\theta(y_i)) \quad (24)$$

Figure 7:
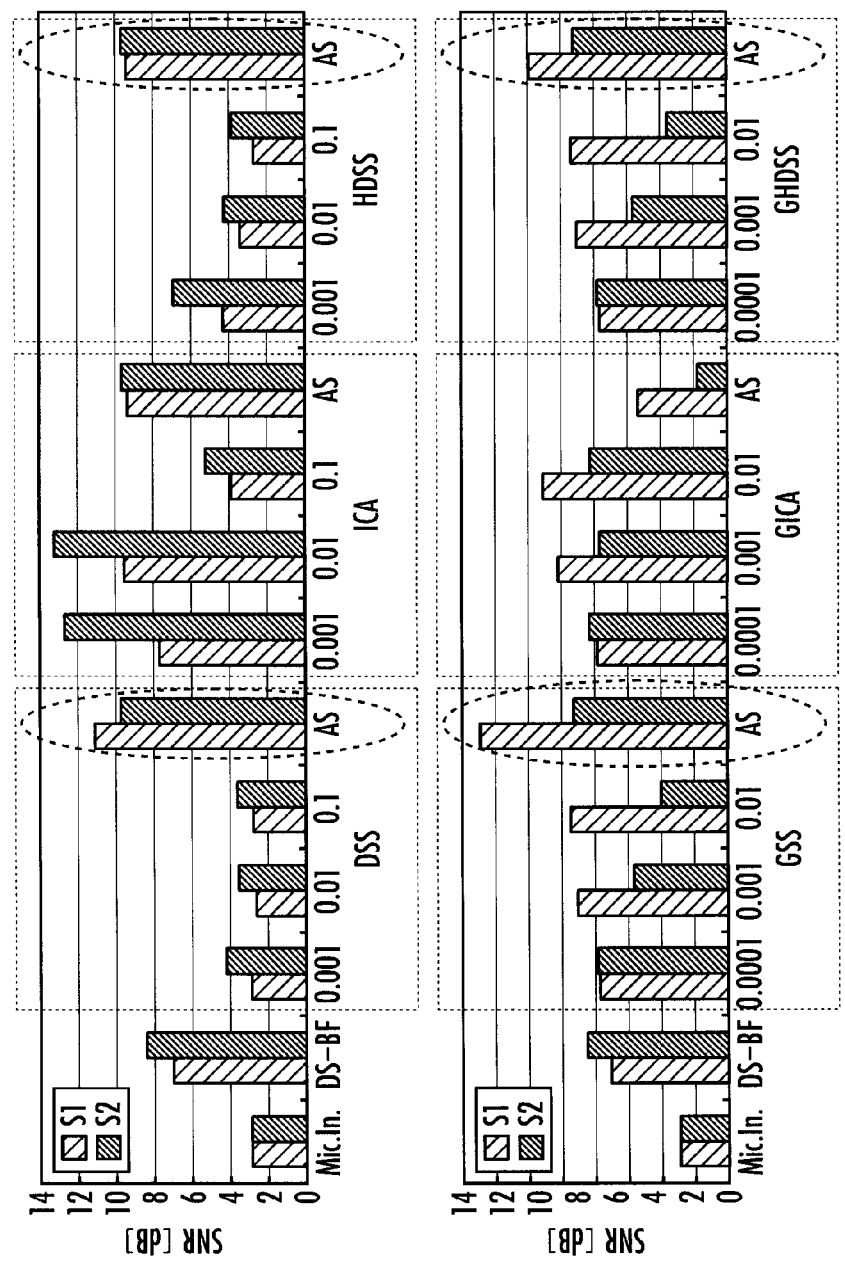
FIG. 7 is a view showing the comparison of a SNR according to methods as a sound source separation experiment result.
Figure 8:
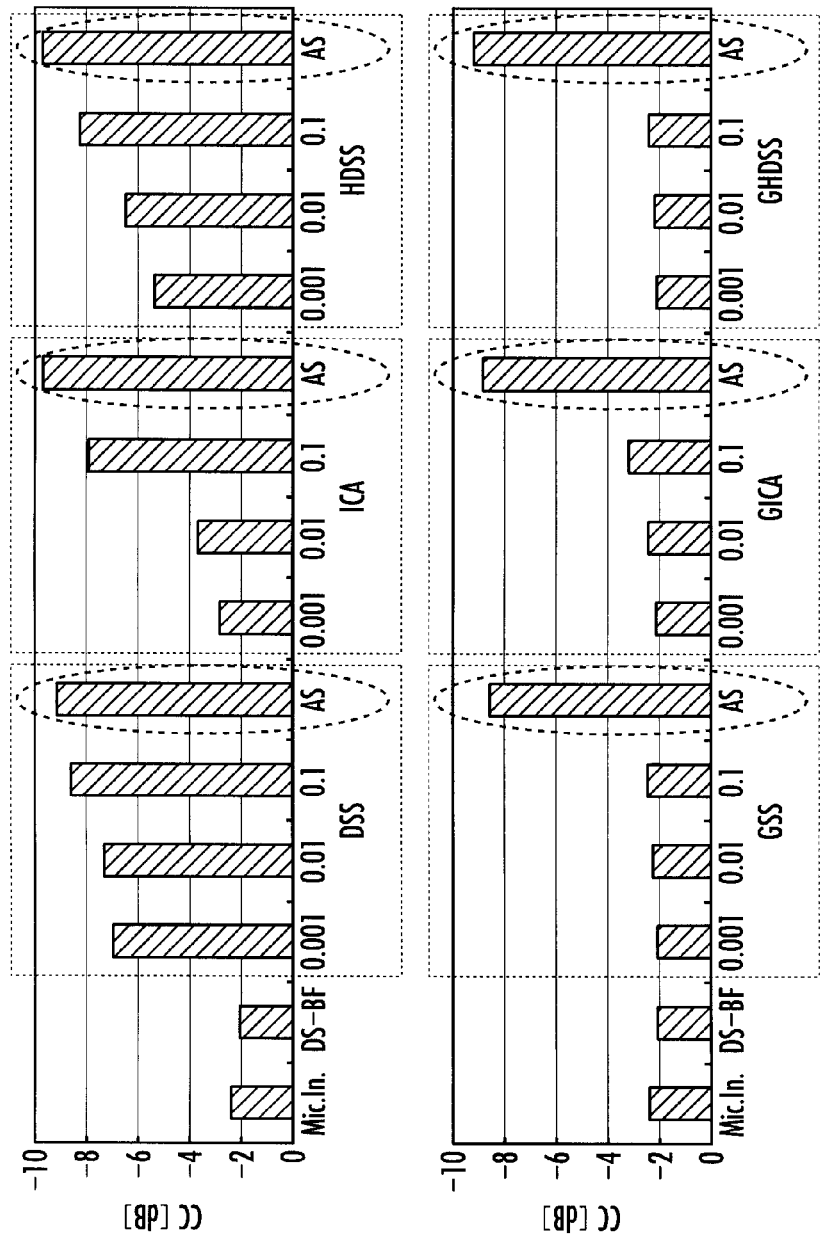
FIG. 8 is a view showing the comparison of a CC according to methods as the sound source separation experiment result.
Figure 9:
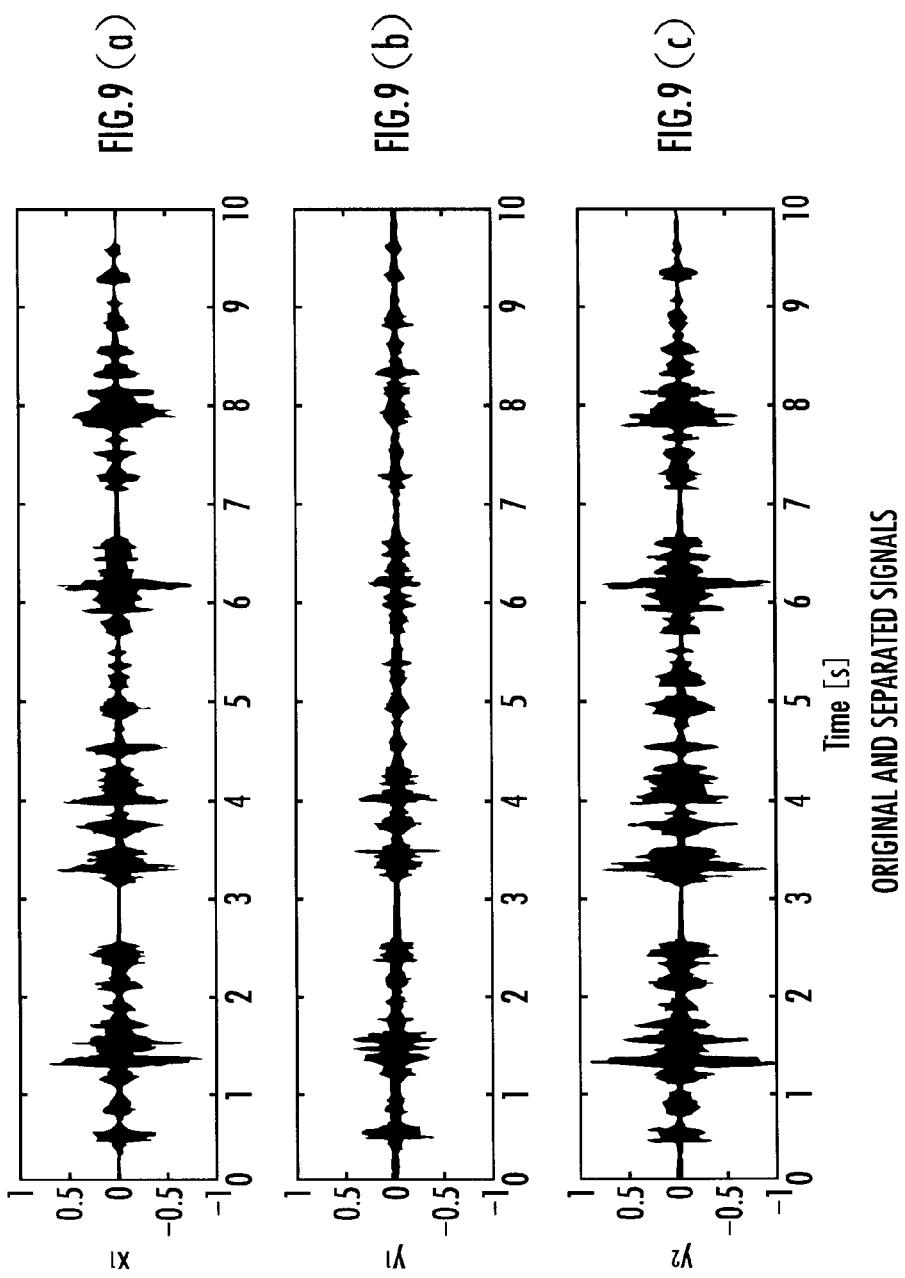
Figure 10:
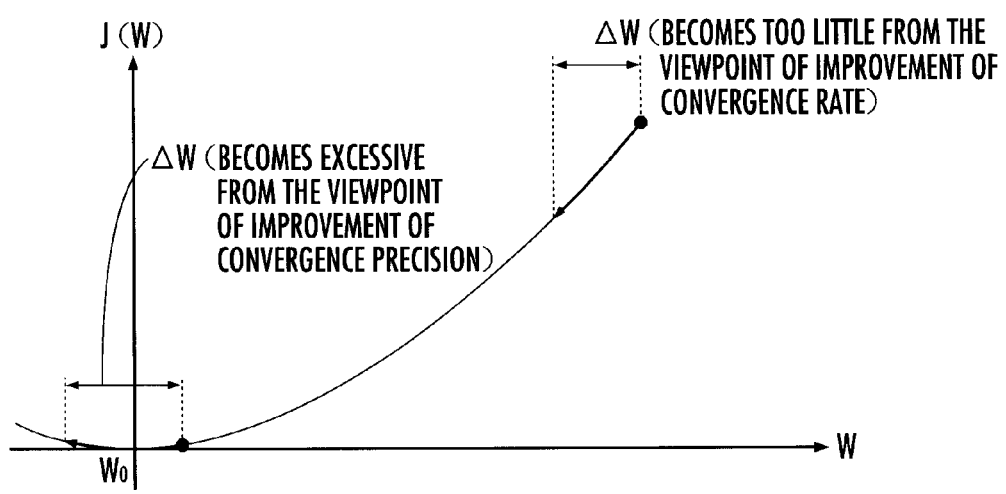
FIGS. 10(a)-10(b) are views explaining problems in a convergence rate and convergence precision according to a cost function.
Figure 10:
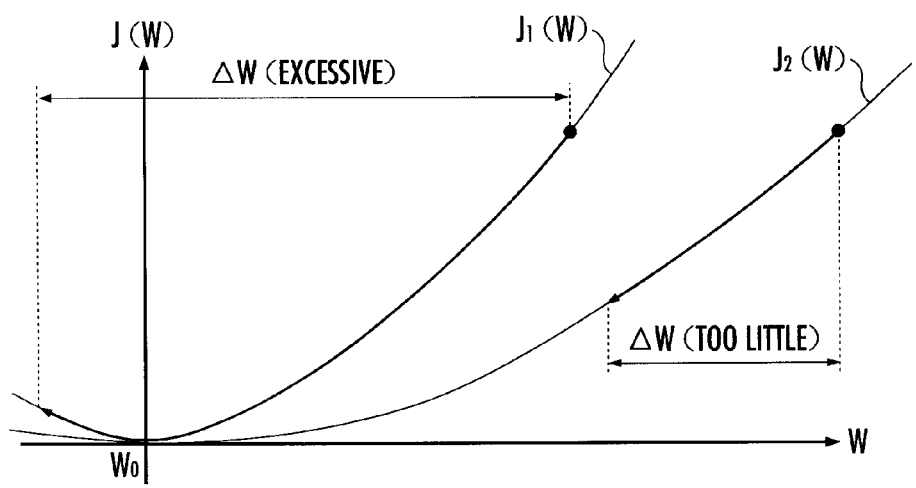

In the BSSs of the DSS, the ICA, the HDSS, the GSS, the GICA and the GHDSS, the SNR of the separated sound source signal in the case where the step-size parameter μ is "0.001", "0.01" and "0.1" and the case where the AS method is applied is shown in FIG. 7, and the CC of the sound source signal is shown in FIG. 8. The waveforms separated according to the GSS-AS are shown in FIGS. 9(a)-9(c). As can be seen from FIG. 7, in the DSS, the SNR was significantly improved by the AS. Even with respect to the ICA and the HDSS, an average SNR was improved. In the conventional method, the correlation coefficient CC is about −3 dB, but, according to the AS, is about −7 dB or more in all the BSSs. It can be seen that the AS is efficient in non-correlation. The cause that the SNR of the GSS and the HDSS is not significantly improved by the AS is a geometric constraint error.

Instead of the multidimensional Newton's method, the step-size parameter μ and the update amount $\Delta W_k$ from the current value $W_k$ of the separation matrix to the next value $W_{k+1}$ are increased as the current value $J(W_k)$ of the cost function is increased. All methods of dynamically adjusting the step-size parameter and the update amount to be decreased as the current gradient $\partial J(W_k)/\partial W$ of the cost function is rapid may be employed.

What is claimed is:

1. A sound source separation system which includes a plurality of microphones and separates a plurality of sound sources on a basis of input signals of the sound sources from the plurality of microphones, the system comprising:
    a first processing element which recognizes a cost function for evaluating separation degrees of the sound source signals, the cost function being defined by a separation matrix representing independency between the input signals and the sound source signals; and
    a second processing element which recognizes the separation matrix when the cost function becomes a minimum value as an optimal separation matrix by iteratively performing a process of updating a current separation matrix such that a next value of the cost function recognized by the first processing element becomes closer to the minimum value than a current value so as to decide a next separation matrix, and adjusts an update amount from the current value of the separation matrix to the next value to be increased as the current value of the cost function is increased and to be decreased as a current gradient of the cost function is rapid.

2. The sound source separation system according to claim 1, wherein the second processing element adjusts the update amount of the separation matrix according a multi-dimensional Newton's method.

3. The sound source separation system according to claim 1, wherein the second processing element updates the current separation matrix by the update amount so as to decide the next separation matrix.

4. The sound source separation system according to claim 1, wherein the second processing element is configured to recognize a convergence of the current value of the cost function as being one of sufficient and insufficient, and to increase the update amount when the current value of the cost function is recognized as being insufficient and decrease the update amount when the current value of the cost function is recognized as being sufficient.

5. The sound source separation system according to claim 4, wherein the second processing element is configured to recognize the current gradient of the cost function as being one of rapid and slow, and to increase the update amount when the current gradient is recognized as being slow and decrease the update amount when the current gradient is recognized as being rapid,
    wherein an absolute value of the increase of the update amount when the current gradient is recognized as being slow is less than an absolute value of the decrease of the update amount when the convergence of the current value of the cost function is recognized as being sufficient, and an absolute value of the decrease of the update amount when the current gradient is recognized as being rapid is less than an absolute value of the increase of the update amount when the convergence of the current value of the cost function is recognized as being insufficient.

6. The sound source separation system according to claim 1, wherein the second processing element is configured to recognize the current gradient of the cost function as being one of rapid and slow, and to increase the update amount when the current gradient is recognized as being slow and decrease the update amount when the current gradient is recognized as being rapid.

7. The sound source separation system according to claim 1, wherein the second processing element is configured to: recognize a convergence of the current value of the cost function as being one of sufficient and insufficient; recognize the current gradient of the cost function as being one of rapid and slow; assign the convergence of the current value and current gradient of the cost function as being in one of a first state, a second state, a third state, and a fourth state; and adjust the update amount based on the recognized one of the first state, second state, third state, and fourth state,
    wherein:
        the first state is assigned when the convergence of the current value of the cost function is recognized as being insufficient and the current gradient of the cost function is recognized as being slow, and the second processing element increases the update amount by a first state amount when the first state is recognized;

the second state is assigned when the convergence of the current value of the cost function is recognized as being insufficient and the current gradient of the cost function is recognized as being rapid, and the second processing element increases the update amount by a second state amount when the second state is recognized, said second state amount being less than said first state amount;

the third state is assigned when the convergence of the current value of the cost function is recognized as being sufficient and the current gradient of the cost function is recognized as being rapid, and the second processing element decreases the update amount by a third state amount when the third state is recognized; and the fourth state is assigned when the convergence of the current value of the cost function is recognized as being sufficient and the current gradient of the cost function is recognized as being slow, and the second processing element decreases the update amount by a fourth state amount when the fourth state is recognized, an absolute value of the fourth state amount being less than an absolute value of the third state amount.

* * * * *